United States Patent
Lewis et al.

(10) Patent No.: US 8,871,669 B2
(45) Date of Patent: Oct. 28, 2014

(54) CATALYST AND METHOD OF MANUFACTURE

(75) Inventors: Larry Neil Lewis, Scotia, NY (US); Oltea Puica Siclovan, Rexford, NY (US); Dan Hancu, Clifton Park, NY (US); Ashish Balkrishna Mhadeshwar, Schenectady, NY (US); Ming Yin, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/789,592

(22) Filed: May 28, 2010

(65) Prior Publication Data

US 2010/0233053 A1   Sep. 16, 2010

Related U.S. Application Data

(63) Continuation-in-part of application No. 12/123,070, filed on May 19, 2008.

(51) Int. Cl.
*B01J 23/00* (2006.01)
*B01J 21/00* (2006.01)
(Continued)

(52) U.S. Cl.
CPC ..... *B01J 35/1061* (2013.01); *B01D 2255/1023* (2013.01); *B01D 2255/106* (2013.01);
(Continued)

(58) Field of Classification Search
USPC ......... 502/240, 243, 258–263, 300, 326, 327, 502/330, 341, 344, 347, 348, 355, 407, 415, 502/439
See application file for complete search history.

(56) References Cited

U.S. PATENT DOCUMENTS

| 4,480,050 A | 10/1984 | Brennan |
| 5,244,852 A | 9/1993 | Lachman et al. |

(Continued)

FOREIGN PATENT DOCUMENTS

| EP | 0526099 A1 | 7/1992 |
| EP | 0577438 A2 | 7/1993 |

(Continued)

OTHER PUBLICATIONS

P.A. Jacobs, et al., Introduction to Acid Cataysis with Zeolites in Hydrocarbon Reactions, Stud. Surf. Sci. Catal. (1991), vol. 58, pp. 445-496.

(Continued)

*Primary Examiner* — Cam N. Nguyen
(74) *Attorney, Agent, or Firm* — Joseph J. Christian

(57) ABSTRACT

A catalyst composition is provided comprising a homogeneous solid mixture having ordered directionally aligned tubular meso-channel pores having an average diameter in a range of about 1 nanometer to about 15 nanometers, wherein the homogeneous solid mixture is prepared from a gel formed in the presence of a solvent, modifier, an inorganic salt precursor of a catalytic metal, an inorganic precursor of a metal inorganic network, and a templating agent. The templating agent comprises an octylphenol ethoxylate having a structure [I]:

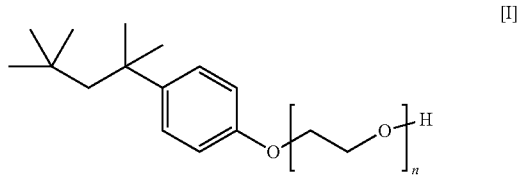

wherein "n" is an integer having a value of about 8 to 20.

14 Claims, 1 Drawing Sheet

(51) Int. Cl.

| | | |
|---|---|---|
| *B01J 20/00* | (2006.01) | |
| *B01J 35/10* | (2006.01) | |
| *B01J 37/02* | (2006.01) | |
| *B01J 23/38* | (2006.01) | |
| *B01J 37/03* | (2006.01) | |
| *B01J 23/40* | (2006.01) | |
| *B01J 23/48* | (2006.01) | |
| *B01J 21/04* | (2006.01) | |
| *B01J 23/50* | (2006.01) | |
| *B01J 23/74* | (2006.01) | |
| *B01D 53/94* | (2006.01) | |

(52) U.S. Cl.
CPC ....... *B01D 2258/012* (2013.01); *B01J 37/0203* (2013.01); *B01J 23/38* (2013.01); *B01D 2255/9205* (2013.01); *B01D 2257/404* (2013.01); *B01J 37/033* (2013.01); *B01J 23/40* (2013.01); *B01D 2255/20753* (2013.01); *B01J 37/0201* (2013.01); *B01J 37/0242* (2013.01); *B01J 23/48* (2013.01); *B01D 2255/2092* (2013.01); *B01J 21/04* (2013.01); *B01D 2255/20738* (2013.01); *B01D 53/9418* (2013.01); *B01J 23/50* (2013.01); *B01D 2255/1021* (2013.01); *B01J 37/036* (2013.01); *B01J 23/74* (2013.01); *B01D 2255/104* (2013.01); *B01D 2255/20746* (2013.01)
USPC ........... 502/300; 502/240; 502/243; 502/258; 502/259; 502/260; 502/261; 502/262; 502/263; 502/326; 502/327; 502/330; 502/332; 502/333; 502/334; 502/335; 502/336; 502/337; 502/338; 502/339; 502/341; 502/344; 502/347; 502/348; 502/355; 502/407; 502/415; 502/439

(56) References Cited

U.S. PATENT DOCUMENTS

| | | | |
|---|---|---|---|
| 5,306,684 | A | 4/1994 | Itoh et al. |
| 5,510,306 | A | 4/1996 | Murray |
| 5,609,839 | A | 3/1997 | Itoh et al. |
| 5,795,559 | A | 8/1998 | Pinnavaia et al. |
| 5,802,845 | A | 9/1998 | Abe et al. |
| 6,146,602 | A | 11/2000 | Narula et al. |
| 6,306,794 | B1* | 10/2001 | Suzuki et al. .................. 502/304 |
| 6,365,118 | B1 | 4/2002 | Kharas et al. |
| 6,703,343 | B2 | 3/2004 | Park |
| 6,932,959 | B2* | 8/2005 | Sterte et al. .................... 423/716 |
| 7,026,264 | B2* | 4/2006 | Mohr et al. ...................... 502/67 |
| 7,045,485 | B2 | 5/2006 | Kelkar et al. |
| 7,081,231 | B1 | 7/2006 | Aardahl et al. |
| 7,132,165 | B2* | 11/2006 | Pinnavaia et al. ............. 428/404 |
| 7,146,802 | B2 | 12/2006 | Lee |
| 7,153,810 | B2 | 12/2006 | Park et al. |
| 7,166,263 | B2* | 1/2007 | Vanderspurt et al. ......... 423/263 |
| 7,371,358 | B2 | 5/2008 | Upchurch et al. |
| 7,396,517 | B2 | 7/2008 | Lee |
| 7,428,810 | B2 | 9/2008 | Driscoll |
| 7,431,905 | B2 | 10/2008 | Hancu et al. |
| 7,448,207 | B2 | 11/2008 | Jozsa et al. |
| 7,534,340 | B2* | 5/2009 | Calemma et al. ............. 208/107 |
| 7,560,408 | B2* | 7/2009 | Calemma et al. ............. 502/214 |
| 7,612,011 | B2* | 11/2009 | Vanderspurt et al. ......... 502/302 |
| 7,709,414 | B2 | 5/2010 | Fujdala et al. |
| 7,803,338 | B2 | 9/2010 | Socha et al. |
| 7,943,548 | B2* | 5/2011 | Castellano et al. ........... 502/327 |
| 8,034,311 | B2 | 10/2011 | Ikeda et al. |
| 8,037,674 | B2 | 10/2011 | Kupe et al. |
| 8,137,750 | B2 | 3/2012 | Brey |
| 2003/0118960 | A1 | 6/2003 | Balmer-Millar et al. |
| 2003/0134645 | A1 | 7/2003 | Stern et al. |
| 2003/0176280 | A1 | 9/2003 | Caze et al. |
| 2004/0042947 | A1 | 3/2004 | Hoard et al. |
| 2004/0179996 | A1 | 9/2004 | Shan et al. |
| 2004/0198586 | A1* | 10/2004 | Mohr et al. ..................... 502/60 |
| 2005/0135980 | A1 | 6/2005 | Park et al. |
| 2005/0239643 | A1 | 10/2005 | Benderly |
| 2006/0030477 | A1 | 2/2006 | Chaumonnot et al. |
| 2006/0133976 | A1 | 6/2006 | Male et al. |
| 2006/0228283 | A1 | 10/2006 | Malaya et al. |
| 2007/0031310 | A1 | 2/2007 | Lee |
| 2007/0059223 | A1 | 3/2007 | Golunski et al. |
| 2007/0101704 | A1 | 5/2007 | Goulette et al. |
| 2007/0149385 | A1 | 6/2007 | Liu et al. |
| 2007/0219088 | A1 | 9/2007 | Chigapov et al. |
| 2008/0020925 | A1 | 1/2008 | Larcher et al. |
| 2008/0035529 | A1* | 2/2008 | Calemma et al. ............. 208/138 |
| 2008/0069743 | A1 | 3/2008 | Castellano |
| 2008/0124264 | A1 | 5/2008 | Ikeda et al. |
| 2008/0131345 | A1 | 6/2008 | Vitse et al. |
| 2008/0141660 | A1 | 6/2008 | Kim et al. |
| 2009/0074641 | A1 | 3/2009 | Lewis et al. |
| 2010/0196236 | A1 | 8/2010 | Lewis et al. |
| 2010/0196237 | A1 | 8/2010 | Yin et al. |
| 2010/0273091 | A1 | 10/2010 | Brey |
| 2011/0047988 | A1 | 3/2011 | Lewis et al. |
| 2011/0047995 | A1 | 3/2011 | Lewis et al. |
| 2011/0209466 | A1 | 9/2011 | Yin |

FOREIGN PATENT DOCUMENTS

| | | |
|---|---|---|
| EP | 0787522 A2 | 8/1997 |
| EP | 1029582 A1 | 8/2000 |
| EP | 1547669 A1 | 6/2005 |
| EP | 1832345 A1 | 9/2007 |
| FR | 2842419 | 1/2004 |
| JP | 06343829 | 12/1994 |
| WO | 9929400 A1 | 6/1999 |
| WO | 0059600 A | 10/2000 |
| WO | 2007049851 A1 | 5/2007 |
| WO | 2009038855 A2 | 3/2009 |

OTHER PUBLICATIONS

M. Richter, et al., Combinatorial Preparation and High-Throughput Catalytic Tests of Multi-Component deNOx Catalysts; Applied Catalysis (2002), vol. 36, Elsevier Science B.V., pp. 261-277.

G.J. de A.A. Soler-Illia, et al., Block Copolymer-Templated Mesoporous Oxides; Current Opinion in Colloid and Interface Science (2003), vol. 8, Elsevier Science, Ltd., pp. 109-126.

W. Deng, et al., Surfactant-Assisted Synthesis of Alumina with Hierarchical Nanopores; Advanced Functional Materials (2003), vol. 13, No. 1, Wiley-VCH Verlag GmbH & Co. KGaA, Weinheim, pp. 61-65.

L.-E. Lindfors, et al., Silver/Alumina Catalyst for Selective Catalytic Reduction of NOx to N2 by Hydrocarbons in Diesel Powered Vehicles (2004), vol. 28, No. 1-4, Plenum Publishing Corporation, pp. 185-189.

S. Panayotova, et al., Borders of the Liquid Crystalline Phase in the Triton X-114—Water Binary System; Bulgarian Journal of Physics (2004), vol. 31, Heron Press Ltd., pp. 83-86.

H. He, et al., Selective Catalytic Reduction of NOx over Ag/AlxO3 Catalyst: From Reaction Mechanism to Diesel Engine Test; Catalysis Today (2005), vol. 100, Elsevier, Inc., pp. 37-47.

V. Gonzalez-Pena, et al., Sol-gel Synthesis of Mesostructured Aluminas from Chemically Modified Aluminum Sec-butoxide Using Non-Ionic Surfactant Templating; Microporous and Mesoporous Materials (2005), vol. 80, Elsevier, Inc., pp. 173-182.

V. Houel, et al., A Comparison of the Activity and Deactivation of Ag/Al2O3 and Cu/ZSM-5 for HC-SCR Under Simulated Diesel Exhaust Emission Conditions; Journal of Catalysis (2005), vol. 230, Elsevier, Inc., pp. 150-157.

R. Brosius, et al., Adsorption Chemistry of NOx on Ag/Al2O3 Catalyst for Selective Catalytic Reduction of NOx using Hydrocarbons; Journal of Catalysis (2005), vol. 231, Elsevier, Inc., pp. 344-353.

A. Zecchina, et al., Anatomy of Catalytic Centers in Phillips Ethylene Polymerization Catalyst; Topics in Organometallic Chemistry (2005), vol. 16 Springer-Verlag Berlin Heidelberg, pp. 1-35.

Z. Liu, et al., Recent Advances in Catalytic DeNOx Science and Technology; Catalysis Reviews (2006), vol. 48, Taylor & Francis Group, LLC., pp. 43-89.

(56) References Cited

OTHER PUBLICATIONS

X. She, et al., A Role of Ag—O—Al Species in Silver-Alumina Catalysts for the Selective Catalytic Reduction of NOx with Methane; Journal of Catalysis (2006), vol. 237, Elsevier, Inc., pp. 79-93.

J.P. Breen, et al., A Fast Transient Kinetic Study of the Effect of H2 on the Selective Catalytic Reduction of NOx with Octane Using Isotopically Labelled 15NO; Journal of Catalysis (2007), vol. 246, Elsevier Inc., pp. 1-9.

V. Houel, et al., Fuel Effects on the Activity of Silver Hydrocarbon-SCR Catalysts; Appl. Catal. B: Environmental (2007), vol. 73, Elsevier B.V., pp. 203-207.

Seker E, Cavataio J, Gulari E, Lorpongpaiboon P, Osuwan S, "Nitric oxide reduction by propene over silver alumina and silver-gold/alumina catalysts: effect of preparation methods" Applied Catalysis A: General, vol. 183, No. 1, 1999, pp. 121-134.

Ken-Ichi Shimizu, , Junji Shibata, Hisao Yoshida, Atsushi SATSUMA1 and Tadashi Hattori,"Silver-alumina catalysts for selective reduction of NO by higher hydrocarbons: structure of active sites and reaction mechanism",Applied Catalysis B: Environmental, vol. 30, Issues 1-2, Feb. 26. 2001, pp. 151-162.

M. Richter, U. Bentrup, R. Eckelt, M. Schneider, M. -M. Pohl and R. Fricke,"The effect of hydrogen on the selective catalytic reduction of NO in excess oxygen over Ag/Al2O3",Applied Catalysis B: Environmental vol. 51, Issue 4, Aug. 25, 2004, pp. 261-274.

Akira Taguchi , Ferdi Schüth,"Ordered mesoporous materials in catalysis", Microporous and Mesoporous Materials vol. 77, Issue 1, Jan. 3, 2005, pp. 1-45.

Avelino Corma,"From Microporous to Mesoporous Molecular Sieve Materials and Their Use in Catalysis", Chem. Rev., 1997,American Chemical Society,vol. 97 (6), pp. 2373-2420.

Tongxiang Fana, Xufan Lia, Jian Dinga, Di Zhanga and Qixin Guob,"Synthesis of biomorphic Al2O3 based on natural plant templates and assembly of Ag nanoparticles controlled within the nanopores",Microporous and Mesoporous Materials ,vol. 108, Issues 1-3, Feb. 1, 2008, pp. 204-212.

Chunqing Liu, Joseph B. Lambert, Lei Fu,"A Novel Family of Ordered, Mesoporous Inorganic/Organic Hybrid Polymers Containing Covalently and Multiply Bound Microporous Organic Hosts", J. Am. Chem. Soc., 2003, 125 (21), pp. 6452-6461.

F. Delprato, A, L. Delmottea, J.L. Gutha ,L. Huvea,"Synthesis of new silica-rich cubic and hexagonal faujasites using crown-etherbased supramolecules as templates", Zeolites,vol. 10, Issue 6, Jul.-Aug. 1990, pp. 546-552.

Soler-Illia GJ, Sanchez C, Lebeau B, Patarin J.,"Chemical strategies to design textured materials: from microporous and mesoporous oxides to nanonetworks and hierarchical structures.",Chem Rev. Nov. 2002;102(11), pp. 4093-4138.

\* cited by examiner

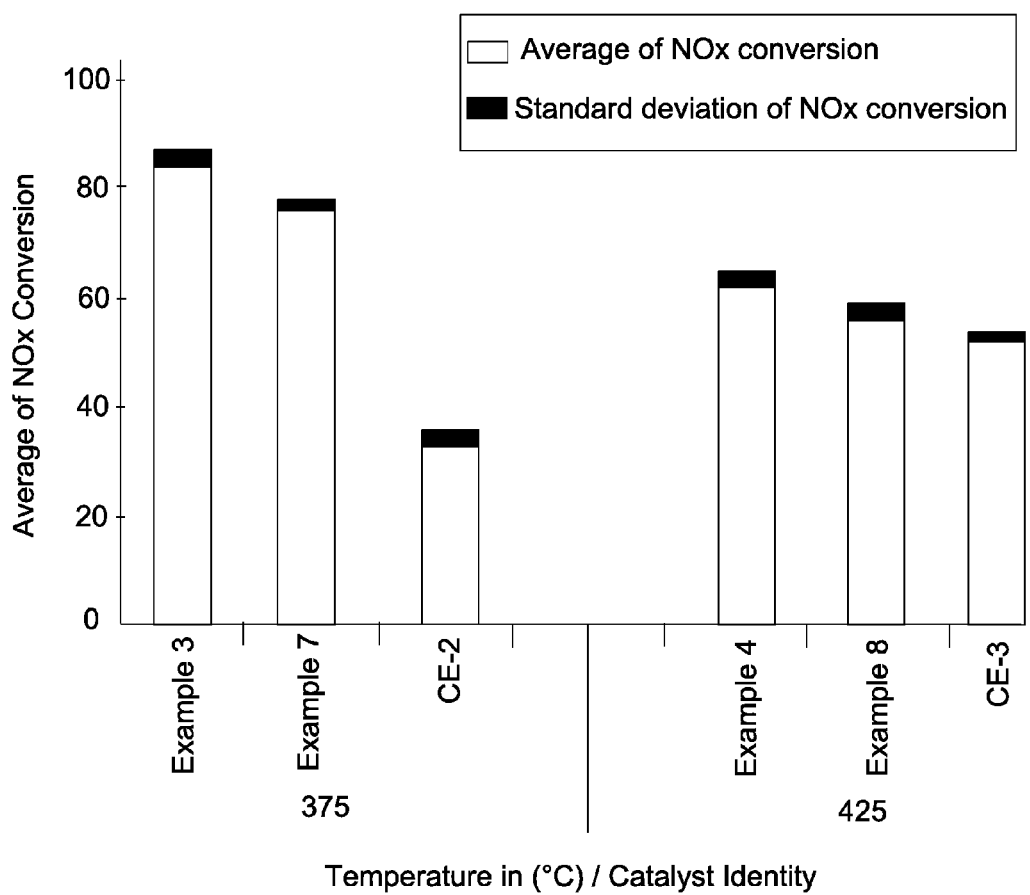

CATALYST AND METHOD OF MANUFACTURE

CROSS-REFERENCE TO RELATED APPLICATIONS

This application claims priority to non-provisional application Ser. No. 12/123,070, filed on 19 May 2008, the entire contents of which are hereby incorporated by reference.

BACKGROUND

The systems and techniques described include embodiments that relate to catalysts. They also include embodiments that relate to the making of catalysts and systems that may include catalysts.

Exhaust streams generated by the combustion of fossil fuels, such as in furnaces, ovens, and engines, contain various potentially undesirable combustion products including nitrogen oxides ($NO_x$), unburned hydrocarbons (HC), and carbon monoxide (CO). $NO_x$, though thermodynamically unstable, may not spontaneously decompose in the absence of a catalyst. Exhaust streams may employ exhaust treatment devices to remove $NO_x$ from the exhaust stream.

Examples of exhaust treatment devices include: catalytic converters (e.g., three-way catalyst, oxidation catalysts, selective catalytic reduction (SCR) catalysts, and the like), evaporative emissions devices, scrubbing devices (e.g., hydrocarbon (HC), sulfur, and the like), particulate filters/traps, adsorbers/absorbers, plasma reactors (e.g., non-thermal plasma reactors and thermal plasma reactors), and the like. A three-way catalyst (TWC catalyst) in a catalytic converter may reduce NO by using CO and residual hydrocarbon. TWC catalysts may be effective over a specific operating range of both lean and rich fuel/air conditions and within a specific operating temperature range.

Particulate catalyst compositions may enable optimization of the conversion of HC, CO, and $NO_x$. The conversion rate may depend on the exhaust gas temperature. The catalytic converter may operate at an elevated catalyst temperature of about 300 degrees Centigrade or higher. The time period between when the exhaust emissions begin (i.e., "cold start"), until the time when the substrate heats up to a light-off temperature, is the light-off time. Light-off temperature is the catalyst temperature at which fifty percent (50 percent) of the emissions from the engine convert as they pass through the catalyst. Alternative methods to heat the catalyst may be employed to bring catalyst temperature to the light off temperature.

The exhaust gases from the engine may heat the catalytic converter. This heating may help bring the catalyst to the light-off temperature. The exhaust gases pass through the catalytic converter relatively unchanged until the light-off temperature is reached. In addition, the composition of the engine exhaust gas changes as the engine temperature increases from a cold start temperature to an operating temperature, and the TWC catalyst may work with the exhaust gas composition that is present at normal elevated engine operating temperatures.

Selective Catalytic Reduction (SCR) may include a noble metal system, base metal system, or zeolite system. The noble metal catalyst may operate in a temperature range from about 240 degrees Centigrade to about 270 degrees Centigrade, but may be inhibited by the presence of $SO_2$. The base metal catalysts may operate in a temperature range from about 310 degrees Centigrade to about 500 degrees Centigrade, but may promote oxidation of $SO_2$ to $SO_3$. The zeolites can withstand temperatures up to 600 degrees Centigrade and, when impregnated with a base metal may have a wide range of operating temperatures. Alternative methods to heat catalyst may be employed to bring catalyst temperature up to lightoff temperature.

SCR systems with ammonia as a reductant may yield $NO_x$ reduction efficiencies of more than 80 percent in large natural gas fired turbine engines, and in lean burn diesel engines. However, the presence of ammonia may be undesirable, and there may be some ammonia slip due to imperfect distribution of reacting gases as well as due to incomplete ammonia consumption. Further ammonia solutions require an extra storage tank and are subject to freezing at cold ambient temperatures.

SCR of $NO_x$ can also be accomplished with hydrocarbons. $NO_x$ can be selectively reduced by some organic compounds (e.g. alkanes, olefins, alcohols) over several catalysts under excess $O_2$ conditions. The injection of diesel or methanol has been explored in heavy-duty stationary diesel engines to supplement the HCs in the exhaust stream. However, the conversion efficiency may be reduced outside the temperature range of 300 degrees Centigrade to 400 degrees Centigrade. In addition, this technique may have HC-slip over the catalyst, transportation and on-site bulk storage of hydrocarbons, and possible atmospheric release of the HC. The partial oxidation of hydrocarbons may release CO, unburned HC, and particulates.

It may be desirable to have a catalyst that can effect emission reduction across a range of temperatures and operating conditions that differ from those currently available.

BRIEF DESCRIPTION

In one embodiment, a method is provided. The method comprises reacting a reactive solution and a templating agent to form a gel; and calcining the gel to form a catalyst composition comprising a homogeneous solid mixture. The homogenous solid mixture contains (i) at least one catalytic metal and (ii) at least one metal inorganic network. The templating agent comprises an octylphenol ethoxylate having a structure [I]:

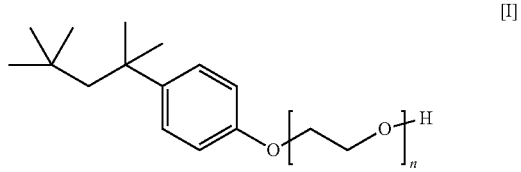

wherein "n" is an integer having a value of about 8 to 20.

In one embodiment, a catalyst composition is provided. The catalyst composition comprises a homogeneous solid mixture containing (i) at least one catalytic metal and (ii) at least one metal inorganic network. The homogenous solid mixture comprises pores having an average diameter in a range of about 1 nanometer to about 15 nanometers. The pores are formed by using a templating agent comprising an octylphenol ethoxylate having a structure [I]:

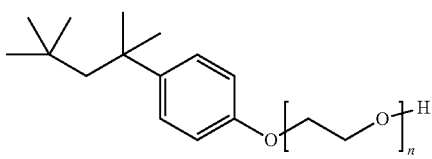

wherein "n" is an integer having a value of about 8 to 20.

BRIEF DESCRIPTION OF FIGURES

FIG. 1 is a graph showing the $NO_x$ conversion at temperatures of 375 degrees Centigrade and 425 degrees Centigrade.

DETAILED DESCRIPTION

The systems and techniques described include embodiments that relate to catalysts. They also include embodiments that relate to the making of catalysts and systems that may include catalysts.

Embodiments of the invention described herein address the noted shortcomings of the state of the art. The method of making the catalyst composition and the catalyst composition described herein fill the needs described above by employing a selected templating agent to provide the homogenous solid mixture containing (i) at least one catalytic metal and (ii) at least one metal inorganic network. The templating agent comprises an octylphenol ethoxylate having a structure [I]. The homogeneous solid mixture includes pores having an average diameter in a range of about 1 nanometer to about 15 nanometers. The catalyst composition may be used for reducing $NO_x$ that is present in an exhaust gas stream including emissions generated from combustion in furnaces, ovens, and engines. The average diameter of the pores in the homogenous solid mixture is effective to prohibit or minimize aromatic species from the exhaust stream in poisoning the catalyst composition.

A catalyst is a substance that can cause a change in the rate of a chemical reaction without itself being consumed in the reaction. A slurry is a mixture of a liquid and finely divided particles. A sol is a colloidal solution. A powder is a substance including finely dispersed solid particles. Templating refers to a controlled patterning. A templating agent refers to a compound or a chemical that enables the controlled patterning. Templated refers to determined control of an imposed pattern and may include molecular self-assembly. A monolith may be a ceramic block having a number of channels, and may be made by extrusion of clay, binders and additives that are pushed through a dye to create a structure.

Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components unless otherwise stated. As used herein, the terms "disposed on" or "deposited over" or "disposed between" refer to both secured or disposed directly in contact with and indirectly by having intervening layers therebetween.

In one embodiment, a method is provided. The method comprises reacting a reactive solution and a templating agent to form a gel; and calcining the gel to form a catalyst composition comprising a homogeneous solid mixture. The homogenous solid mixture contains (i) at least one catalytic metal and (ii) at least one metal inorganic network. The templating agent comprises an octylphenol ethoxylate having a structure [I]

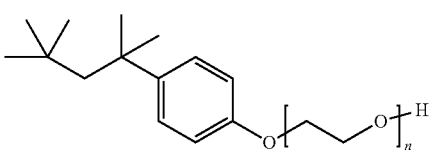

wherein "n" is an integer having a value of about 8 to 20.

In one embodiment, the reactive solution comprises a metal inorganic support precursor, a solvent, a modifier, and a templating agent. The reactive solution includes a metal inorganic support precursor, which is initially in the form of a sol, and is converted to a gel by the sol gel process. The gel is filtered, washed, dried and calcined to yield the metal inorganic support. The catalytic metal may be impregnated into the metal inorganic support using different methods to form the homogenous solid mixture. The use of the templating agent in the reactive solution controls pore formation in the metal inorganic support. In one embodiment, the method further comprises controlling particle size of catalytic metal by reducing the catalytic metal lability or propensity to agglomerate. In one embodiment, the method further comprises controlling particle size of catalytic metal by controlling, with respect to pore formation of the porous template, one or more of pore size, pore distribution, pore spacing, or pore dispersity.

In one embodiment, the catalytic metal may be impregnated after the formation of the metal inorganic support. The metal inorganic support is coated with a solution of a metal salt to form a washcoated metal inorganic support. The solution of the metal salt includes a metal salt and a solvent. Suitable metal salts and solvents are listed herein. The coating process may include dip coating, spin coating, centrifuging, spray coating, painting by hand or by electrostatic spray painting, or the like. The washcoated metal inorganic support is subjected to the calcination process discussed below, to reduce the metal salt to a metal and to form the catalyst composition.

In one embodiment, the catalytic metal may be incorporated by impregnating a catalytic metal precursor into the gel by incipient wetness impregnation after gel formation and before the calcination process. During the calcination process, the metal precursor may be reduced to the corresponding catalytic metal.

In one embodiment, the reactive solution may include a catalytic metal precursor in addition to the metal inorganic support precursor, the solvent, the modifier, and the templating agent during the gel formation step. The gel formed includes the catalytic metal precursor. The gel is then calcined to form the homogenous solid mixture containing a metal inorganic support and a catalytic metal.

In one embodiment, the gel may be subjected to supercritical extraction in order to produce the porous metal inorganic support. Carbon dioxide can be used as the supercritical fluid to facilitate the supercritical extraction.

In one embodiment, the calcination is conducted at temperatures in a range from about 350 degrees Centigrade to about 800 degrees Centigrade. In another embodiment, the calcination is conducted at temperatures in a range from about 400 degrees Centigrade to about 700 degrees Centigrade. In yet another embodiment, the calcination is conducted at temperatures in a range from about 450 degrees Centigrade to about 750 degrees Centigrade. In one embodiment, the calcination is conducted at a temperature of about 550 degrees Centigrade. In various embodiments, the calcination may be conducted for a time period in a range from about 10 minutes to about 30 minutes, from about 30 minutes to about 60 minutes, from about 60 minutes to about 1 hour, from about 1 hour to about 10 hours, from about 10 hours to about 24 hours, or from about 24 hours to about 48 hours.

In one embodiment, the metal inorganic support precursors include inorganic alkoxides. Suitable inorganic alkoxides may include one or more of tetraethyl orthosilicate, tetramethyl orthosilicate, aluminum isopropoxide, aluminum tributoxide, aluminum ethoxide, aluminum-tri-sec-butoxide, aluminum tert-butoxide, antimony (III) ethoxide, antimony (III) isopropoxide, antimony (III) methoxide, antimony (III) propoxide, barium isopropoxide, calcium isopropoxide, calcium methoxide, chloro triisopropoxy titanium, magnesium di-tert-butoxide, magnesium ethoxide, magnesium methoxide, strontium isopropoxide, tantalum (V) butoxide, tantalum (V) ethoxide, tantalum (V) ethoxide, tantalum (V) methoxide, tin (IV) tert-butoxide, diisopropoxytitanium bis(acetylacetonate) solution, titanium (IV) (triethanolaminato) isopropoxide solution, titanium (IV) 2-ethylhexyloxide, titanium (IV) bis(ethyl acetoacetato) diisopropoxide, titanium (IV) butoxide, titanium (IV) butoxide, titanium (IV) diisopropoxide bis(2,2,6,6-tetramethyl-3,5-heptanedionate), titanium (IV) ethoxide, titanium (IV) isopropoxide, titanium (IV) methoxide, titanium (IV) tert-butoxide, vanadium (V) oxytriethoxide, vanadium (V) oxytriisopropoxide, yttrium (III) butoxide, yttrium (III) isopropoxide, zirconium (IV) bis (diethyl citrato) dipropoxide, zirconium (IV) butoxide, zirconium (IV) diisopropoxidebis (2,2,6,6-tetramethyl-3,5-heptanedionate), zirconium (IV) ethoxide, zirconium (IV) isopropoxide zirconium (IV) tert-butoxide, zirconium (IV) tert-butoxide, or the like. In one embodiment, the inorganic alkoxide is aluminum sec-butoxide.

In various embodiments, the reactive solution contains an inorganic alkoxide in an amount greater than about 1 weight percent based on the weight of the reactive solution. In one embodiment, the reactive solution contains an inorganic alkoxide in an amount in a range from about 1 weight percent to about 50 weight percent based on the weight of the reactive solution. In another embodiment, the reactive solution contains an inorganic alkoxide in an amount in a range from about 5 weight percent to about 40 weight percent based on the weight of the reactive solution. In one embodiment, the reactive solution contains an inorganic alkoxide in an amount in a range from about 10 weight percent to about 30 weight percent based on the weight of the reactive solution.

In various embodiments, the solvents include one or more solvents selected from aprotic polar solvents, polar protic solvents, and non-polar solvents. Suitable aprotic polar solvents may include propylene carbonate, ethylene carbonate, butyrolactone, acetonitrile, benzonitrile, nitromethane, nitrobenzene, sulfolane, dimethylformamide, N-methylpyrrolidone, or the like. Suitable polar protic solvents may include water, nitromethane, acetonitrile, and short chain alcohols. Suitable short chain alcohols may include one or more of methanol, ethanol, propanol, isopropanol, butanol, or the like. Suitable non polar solvents may include benzene, toluene, methylene chloride, carbon tetrachloride, hexane, diethyl ether, or tetrahydrofuran. In one embodiment, a combination of solvents may also be used. Ionic liquids may be used as solvents during gelation. In one embodiment, the solvents include 2-butanol and 2-propanol.

In various embodiments, the solvent may be present in an amount greater than about 0.5 weight percent, based on the weight of the reactive solution. In one embodiment, the amount of solvent present may be in a range from about 0.5 weight percent to about 800 weight percent, based on the weight of the reactive solution. In another embodiment, the amount of solvent present may be in a range from about 20 weight percent to about 700 weight percent, based on the weight of the reactive solution. In yet another embodiment, the amount of solvent present may be in a range from about 50 weight percent to about 600 weight percent, based on the weight of the reactive solution. Selection of the type and amount of solvent may affect or control the amount of porosity generated in the catalyst composition, as well as affect or control other pore characteristics.

Modifiers may be used to control hydrolysis kinetics of the inorganic alkoxides. Suitable modifiers may include one or more ethyl acetoacetate (EA), ethylene glycol (EG), triethanolamine (TA), or the like. In one embodiment, the reactive solution contains a modifier in an amount greater than about 0.1 weight percent, based on the weight of the reactive solution. In one embodiment, the amount of modifier present may be in a range from about 0.1 weight percent to about 5 weight percent, based on the weight of the reactive solution. In another embodiment, the amount of modifier present may be in a range from about 1 weight percent to about 4 weight percent, based on the weight of the reactive solution. In yet another embodiment, the amount of modifier present may be in a range from about 2 weight percent to about 3 weight percent, based on the weight of the reactive solution.

The templating agents serve as templates and may facilitate the production of metal inorganic supports containing directionally aligned tubular meso-channel forms, or pores. Control of the pore characteristic may, in turn, provide control of the particle size of catalytic metal by reducing the catalytic metal lability or propensity to agglomerate. The particle size of catalytic metal may be controlled, with respect to pore formation of the porous template, by controlling or affecting one or more of pore size, pore distribution, pore spacing, or pore dispersity.

The reactive solution may include the templating agent in an amount greater than about 0.1 weight percent, based on the weight of the reactive solution. In one embodiment, the templating agent amount is present in a range from about 0.01 weight percent to about 50 weight percent, based on the weight of the reactive solution. In another embodiment, the templating agent amount is present in a range from about 1 weight percent to about 45 weight percent, based on the weight of the reactive solution. In yet another embodiment, the templating agent amount is present in a range from about 2 weight percent to about 40 weight percent, based on the weight of the reactive solution. In one embodiment, the amount of templating agent based on the weight of the reactive solution is about 1.5 weight percent to about 5 weight percent.

Selection of the type(s) and amounts of the templating agent may affect or control the pore characteristics of the resultant templated metal inorganic support. Suitable templating agents may include one or more surfactants selected from an octylphenol ethoxylate having a structure [I]

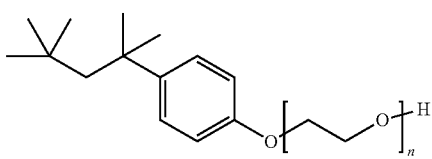

wherein "n" is an integer having a value of about 8 to 20. In one embodiment, "n" is an integer having a value 12 and the octylphenol ethoxylate has a structure [II].

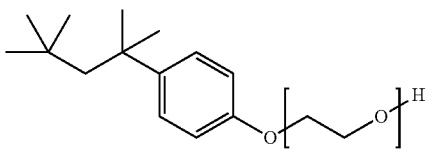

In another embodiment, "n" is an integer having a value 16 and the octylphenolethoxylate has a structure [III]

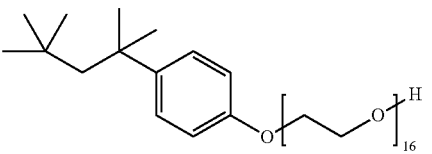

Octylphenol ethoxylate having a structure [II], where "n" is an integer having a value 12, is commercially available as TRITON™ X-102. Octylphenol ethoxylate having a structure [III], where "n" is an integer having a value 16, is commercially available as TRITON™ X-165.

Suitable metal salts may include the salts of transition metals. In one embodiment, metal salts may include one or more metals selected from silver, platinum, gold, palladium, iron, nickel, cobalt, or the like. Suitable salts may include halides, sulfates, nitrates, sulfides, or the like. In one embodiment, the salt is silver nitrate.

The metal salt may be present in the reactive solution in an amount greater than about 0.1 weight percent, based on the weight of the reactive solution. In one embodiment, the metal salt is present in an amount that is in a range from about 0.01 weight percent to about 50 weight percent, based on the weight of the reactive solution. In another embodiment, the metal salt is present in an amount that is in a range from about 0.2 weight percent to about 45 weight percent, based on the weight of the reactive solution. In yet another embodiment, the metal salt is present in an amount that is in a range from about 1 weight percent to about 35 weight percent, based on the weight of the reactive solution. In one embodiment, the amount of metal salt in the reactive solution is in a range from about 1.5 weight percent to about 5 weight percent, based on the weight of the reactive solution.

The catalyst composition may be manufactured in powdered form. The catalyst composition may be manufactured in the form of a monolith. In one embodiment, the catalyst composition may be disposed on a prefabricated monolithic core. The prefabricated monolith core with the catalyst composition disposed thereon may be subjected to freeze drying as well as to calcining to produce a monolithic catalyst composition. In one embodiment, the prefabricated monolith core with the catalyst composition disposed thereon may be subjected to supercritical fluid extraction and to calcining to produce a monolithic catalyst composition.

In one embodiment, the average pore size of the metal inorganic support is controlled and selected to reduce or eliminate poisoning. Poisoning may affect catalytic ability, and may be by aromatic species present in the reductant or in the exhaust gas stream. The porous material described herein is more resistant to poisoning from an aromatic containing reductant than a baseline typical gamma phase alumina impregnated with silver.

After formation, the catalyst composition may be disposed in an exhaust gas stream of an automobile or a locomotive having $NO_x$ therein. The catalyst composition contacts and reduces $NO_x$ to nitrogen. The catalyst may be disposed into the exhaust gas stream either in powdered form or in the form of a monolith.

In one embodiment, the catalytic metal may include one or more of alkali metals, alkaline earth metals, and transition metals. Suitable metals that may be used as the catalytic metal may include silver, platinum, gold, palladium, iron, nickel, cobalt, gallium, indium, ruthenium, rhodium, osmium, iridium, or combinations of at least two of the foregoing metals. In one embodiment, the catalytic metal is selected from one or more of gallium, indium, and silver. In one embodiment, the catalytic metal is silver.

An average catalyst composition particle size is less than about 100 nanometers. In one embodiment, the average catalytic composition particle size is in a range of from about 0.1 nanometers to about 1 nanometer, from about 1 nanometer to about 5 nanometers, from about 5 nanometers to about 15 nanometers, from about 15 nanometers to about 25 nanometers, from about 25 nanometers to about 50 nanometers, or greater than about 50 nanometers. In one embodiment, the average catalyst composition particle size is in a range from about 0.1 nanometers to about 90 nanometers. In another embodiment, the average catalyst composition particle size is in a range from about 1 nanometer to about 80 nanometers. In yet another embodiment, the average catalyst composition particle size is in a range from about 5 nanometers to about 50 nanometers.

In various embodiments, the catalytic metal may be present in the catalyst composition in an amount greater than about 0.025 mole percent. One skilled in the art will appreciate that the amount selection may be based on end use parameters, economic considerations, desired efficacy, and the like. In one embodiment, the amount of the catalytic metal present in the catalyst composition is in a range from about 0.25 mole percent to about 10 mole percent. In another embodiment, the amount of the catalytic metal present in the catalyst composition is in a range from about 0.5 mole percent to about 9 mole percent. In yet another embodiment, the amount of the catalytic metal present in the catalyst composition is in a range from about 1 mole percent to about 8 mole percent. In one embodiment, the amount of catalytic metal in the catalyst composition is about 1.5 mole percent to about 6 mole percent.

In one embodiment, the metal inorganic support may include an inorganic material. As used herein, the phrase "metal inorganic support" means a support that comprises an inorganic material, which material in part contains atoms or cations of one or more of the metal elements. Suitable inorganic materials may include, for example, oxides, carbides, nitrides, hydroxides, oxides, carbonitrides, oxynitrides, borides, or borocarbides. In one embodiment, the inorganic oxide may have hydroxide coatings. In one embodiment, the inorganic oxide may be a metal oxide. The metal oxide may have a hydroxide coating. Other suitable metal inorganics may include one or more metal carbides, metal nitrides, metal hydroxides, metal carbonitrides, metal oxynitrides, metal borides, or metal borocarbides. Metallic cations used in the foregoing inorganic materials can be transition metals, alkali metals, alkaline earth metals, rare earth metals, or the like.

Examples of suitable inorganic oxides include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (for example, FeO, beta-$Fe_2O_3$, gamma-$Fe_2O_3$, beta-$Fe_2O_3$, $Fe_3O_4$, or the like), calcium oxide (CaO), and manganese dioxide (MnO2 and $Mn_3O_4$). Examples of suitable inorganic carbides include silicon carbide (SiC), titanium carbide (TiC), tantalum carbide (TaC), tungsten carbide (WC), hafnium carbide (HfC), or the like. Examples of suitable nitrides include silicon nitrides ($Si_3N_4$), titanium nitride (TiN), or the like. Examples of suitable borides include lanthanum boride ($LaB_6$), chromium borides (CrB and $CrB_2$), molybdenum borides ($MoB_2$, $Mo_2B_5$ and MoB), tungsten boride ($W_2B_5$), or the like. In one embodiment, the inorganic metal inorganic support is alumina. The alumina employed may be crystalline or amorphous. In one embodiment, the porous metal inorganic support comprises porous alumina and the catalytic metal comprises silver.

In one embodiment, the metal inorganic support has an average diameter of pores greater than about 0.5 nanometers. In one embodiment, the metal inorganic support may have average diameters of pores in a range from about 1 nanometer to about 15 nanometers. In another embodiment, the metal inorganic support may have average diameters of pores in a range from about 2 nanometers to about 12 nanometers. In yet another embodiment, the metal inorganic support may have average diameters of pores in a range from about 3 nanometers to about 10 nanometers. In one embodiment, the metal inorganic support may have average diameter of pores in a range from about 1 nanometer to about 5 nanometers. The average diameter of pores may be measured using nitrogen adsorption measurements with BET method. BET theory is a rule for the physical adsorption of gas molecules on a solid surface and serves as the basis for an important analysis technique for the measurement of the specific surface area of a material. BET is short hand for the names of the developers of the theory: Stephen Brunauer, Paul Hugh Emmett, and Edward Teller.

In certain embodiments, the pore size has a narrow monomodal distribution. In one embodiment, the pores have a pore size distribution polydispersity index that is less than about 1.5, such as, in some embodiments, less than about 1.3, and, in particular embodiments, less than about 1.1. In one embodiment, the distribution of diameter sizes may be bimodal, or multimodal.

In another embodiment, the porous metal inorganic support includes one or more stabilizers, which may be added to the metal inorganic support. For example, in various embodiments, the metal inorganic support comprising predominantly alumina has smaller amounts of yttria, zirconia, or ceria added to it. In one embodiment, the amount of yttria, zirconia, or ceria is in a range of about 0.1 percent to about 10 percent based on the weight of the alumina. In another embodiment, the amount of yttria, zirconia, or ceria is in a range of about 1 percent to about 9 percent based on the weight of the alumina. In yet another embodiment, the amount of yttria, zirconia, or ceria is in a range of about 2 percent to about 6 percent based on the weight of the alumina.

In one embodiment, the pores may be distributed in a controlled and repeating fashion to form a pattern. In another embodiment, the pore arrangement is regular and not random. As defined herein, the phrase "pore arrangement is regular" means that the pores may be ordered and may have an average periodicity. The average pore spacing may be controlled and selected based on the surfactant selection that is used during the gelation. In one embodiment, the pores are unidirectional, are periodically spaced, and have an average periodicity. In one embodiment, the porous metal inorganic support has pores that have a spacing of greater than about 20 Angstroms. In one embodiment, the spacing is in a range from about 30 Angstroms to about 300 Angstroms. In another embodiment, the spacing is in a range from about 50 Angstroms to about 200 Angstroms. In yet another embodiment, the spacing is in a range from about 60 Angstroms to about 150 Angstroms. The average pore spacing (periodicity) may be measured using small angle X-ray scattering. In yet another embodiment, the pore spacing is random.

The porous metal inorganic support may have a surface area greater than about 50 square meters per gram. In one embodiment, the porous metal inorganic support has a surface area that is in a range from about 50 square meters per gram to about 2000 square meters per gram. In another embodiment, the porous metal inorganic support has a surface area that is in a range from about 100 square meters per gram to about 1000 square meters per gram. In one embodiment, the porous metal inorganic support has a surface area that is in a range from about 300 square meters per gram to about 600 square meters per gram.

The porous metal inorganic support may be present in the catalyst composition in an amount that is greater than about 50 mole percent. In one embodiment, the amount present is in a range from about 50 mole percent to about 99 mole percent based on the catalyst composition. In another embodiment, the amount present is in a range from about 55 mole percent to about 89 mole percent based on the catalyst composition. In yet another embodiment, the amount present is in a range from about 60 mole percent to about 79 mole percent based on the catalyst composition. In one embodiment, the amount present is in a range from about 94 mole percent to about 99 mole percent based on the catalyst composition.

The porous metal inorganic support may be made up of particles. The particles may be agglomerates, a sintered mass, a surface coating on a support, or the like. The porous metal inorganic support may have an average particle size of up to about 4 millimeters. In one embodiment, the porous inorganic materials may have an average particle size in a range from about 5 micrometers to about 3 millimeters. In another embodiment, the porous inorganic materials may have an average particle size in a range from about 500 micrometers to about 2.5 millimeters. In yet another embodiment, the porous inorganic materials may have an average particle size in a range from about 1 millimeter to about 2 millimeters. In one embodiment, the porous metal inorganic support has an average particle size of about 40 micrometers.

In one embodiment, the catalyst composition may further comprise at least one promoting metal. A promoting metal is a metal that enhances the action of a catalyst. In one embodiment, the promoting metal may be selected from the group consisting gallium, indium, gold, vanadium, zinc, tin, bismuth, cobalt, molybdenum, and tungsten. In one embodiment, the promoting metal may be present in an amount in a range from about 0.1 weight percent to about 20 weight percent, based upon the total weight of the catalyst composition. In another embodiment, the promoting metal may be present in an amount in a range from about 0.5 weight percent to about 15 weight percent, based upon the total weight of the catalyst composition. In yet another embodiment, the promoting metal may be present in an amount in a range from about 1 weight percent to about 12 weight percent, based upon the total weight of the catalyst composition.

In one embodiment, a reductant may be employed with the catalyst composition. When the catalyst composition is employed to reduce $NO_x$ generated in emissions from furnaces, ovens, locomotives and engines, a variety of hydrocarbons may be effectively used as a reductant. In one embodiment, the reductant is a hydrocarbon. In one embodiment, the hydrocarbon has an average carbon chain length in the range of about 2 carbon atoms to about 24 carbon atoms. In one embodiment, the reductant is diesel, ultra-low sulfur diesel, ethanol, gasoline, octane, or some combination including one or more of these. In one embodiment, the reductant is an oxygenated hydrocarbon. In one embodiment, the oxygenated hydrocarbon is ethanol.

In one embodiment, diesel can be used as a reductant. The catalyst composition can reduce $NO_x$ while using higher hydrocarbons having from about 5 to about 9 carbon atoms per molecule as a reductant. The catalyst system advantageously functions across a variety of temperature ranges. Suitable temperature ranges may include temperatures of greater than about 325 degrees Centigrade. Other temperatures ranges may include those up to about 475 degrees Centigrade.

In certain embodiments, a co-reductant may be used with hydrocarbon reductant to lower the light off temperature of the catalyst. In one embodiment, the co-reductant is hydrogen. In one embodiment, the amount of co-reductant employed may be in a range from about 0 parts per million to about 4000 parts per million based on the total volumetric flow rate of the exhaust. In another embodiment, the amount of co-reductant employed may be in a range from about 10 parts per million to about 3000 parts per million based on the total volumetric flow rate of the exhaust. In yet another embodiment, the amount of co-reductant employed may be in a range from about 20 parts per million to about 2000 parts per million based on the total volumetric flow rate of the exhaust. In one embodiment, the amount of co-reductant employed may be in a range from about 0 parts per million to about 1000 parts per million based on the total volumetric flow rate of the exhaust.

In one embodiment, a catalyst composition is provided. The catalyst composition comprises a homogeneous solid mixture containing (i) at least one catalytic metal and (ii) at least one metal inorganic network. The homogenous solid mixture comprises pores having an average diameter in a range of about 1 nanometer to about 15 nanometers; and wherein the pores are formed by using a templating agent comprising an octylphenol ethoxylate having a structure [I]:

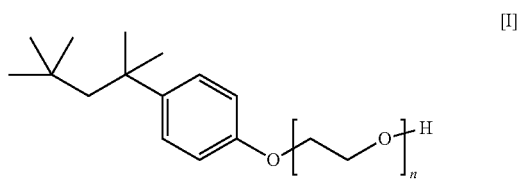

wherein "n" is an integer having a value of about 8 to 20.

EXAMPLES

The following examples illustrate methods and embodiments in accordance with exemplary embodiments, and as such should not be construed as imposing limitations upon the claims. All components are commercially available from common chemical suppliers. The component and the source are listed in Table 1 given below.

TABLE 1

| Component | Source |
| --- | --- |
| Ethylacetoacetate | Aldrich |
| TRITON ™ X-114 | Aldrich |
| TRITON ™ X-102 | Aldrich |
| TRITON ™ X-165 | Aldrich |
| Aluminum sec-butoxide | Gelest |
| Silver nitrate | GFS chemicals Inc. |
| Iso propyl alcohol | EM Scientific |

Examples 1-2 (E1-E2)

Preparation of Catalyst Composition

The catalyst composition is manufactured by making a first solution, a second solution and a third solution, which are mixed together. The chemicals used for making the first solution, second solution and third solution are listed in Table 2 below. The first solution was prepared by mixing ethyl acetoacetate, TRITON™ X and isopropyl alcohol. The mixing was carried out in a 5 liter, 3-neck flask equipped with a feed tube from a peristaltic pump, a condenser, and a mechanical stirrer. The second solution was prepared by mixing aluminum sec-butoxide ($Al(O^{sec}Bu)_3$) and isopropyl alcohol. The second solution was added to the first solution at an ambient temperature of about 25 degrees Centigrade with stirring and held at 25 degrees Centigrade for about 30 minutes. The third solution was prepared by mixing silver nitrate, water, and isopropyl alcohol. The third solution was prepared by first dissolving silver nitrate in water and the resultant solution was diluted with isopropyl alcohol. The third solution was added to the mixture of the first solution and the second solution via the feed tube under stirring at a rate of about 4 milliliters per minute at a temperature of about 25 degrees Centigrade. The contents of the flask were then heated to reflux and maintained under reflux for about 24 hours. The resultant solution was maroon in color.

The flask was then cooled to a temperature of about 25 degrees Centigrade and the contents filtered. The resultant solid was Soxhlet extracted using ethanol for a period of about 1 day under reflux. The resultant brown solid was then dried under vacuum at a temperature of 100 degrees Centigrade and 30 millimeters of mercury to yield the reaction product in the form of a white powder. The dry reaction product was heated under a flow of nitrogen in a tube furnace from a temperature of about 25 degrees Centigrade to about 550 degrees Centigrade at a heating rate of 2 degrees Centigrade/minute. The temperature was then maintained at 550 degrees Centigrade for 1 hour. The reaction product was then calcined in the presence of air at 550 degrees Centigrade for 5 hours to produce a metal inorganic complex. Weight of the powder after calcination was determined and is provided in Table 2 below.

TABLE 2

| Examples/Chemicals | EtAcOAc grams | Al(O$^{sec}$Bu)$_3$ grams | TRITON ™ X- grams | AgNO$_3$ grams | Water milliliters | IPA milliliters | Rate of addition of third solution milliliters per minute | Yield after calcination grams |
|---|---|---|---|---|---|---|---|---|
| Example 1 | 13.41 | 249.8 | 69.9 (X102) | 2.58 | 37 | 300 + 1000 + 425 | 3.6 | 55.2 |
| Example 2 | 13.41 | 250.3 | 69.7 (X165) | 2.56 | 37 | 300 + 1000 + 425 | 3.6 | 57.9 |

Comparative Example 1 (CE-1)

Preparation of Porous Alumina with Silver

A 100 gallon reactor equipped with a stirrer was charged with: isopropyl alcohol (72 kilograms), ethylacetoacetate (936 grams), TRITON™ X-114 (octylphenol ethoxylate having a structure [I], where "n" is an integer having a value 7 to 8 is commercially available as TRITON™ X-114) (3.12 kilograms) and Aluminum (sec-butoxide)$_3$ (18 kilograms). The resultant mixture was stirred for about 30 minutes, at a temperature of about 28 degrees Centigrade to form a first solution. In another separate flask, silver nitrate (290.4 grams) was dissolved in water (2.64 liters) and then isopropyl alcohol (22 kilograms) was added to form a second solution. The second solution was added to the first solution at an addition rate of about 180 milliliters per minute. An increase in temperature to about 35 degrees Centigrade was noted after the addition. The resultant solution was stirred at 28 degrees Centigrade for another 2.5 hours. The solution was then heated to reflux. The solution was stirred (stirring rate of 120 revolutions per minute) and maintained at reflux for a period of about 36 hours.

The resultant solution was spray dried at a temperature of about 100 degrees Centigrade to remove the solvents to provide a powder with a yield of over 80 percent, and having an average particle size diameter of less than about 10 microns. The spray dried powder was then further processed in two steps, (i) pyrolysis and (ii) calcination. The two step process was performed to remove the organic components TRITON™ X-114, ethyl acetoacetate, and isopropyl alcohol, without exposing the powder to the temperature rise equivalent to combustion of the organic components.

For step (i) pyrolysis, the powder was loaded in multiple batches, into two quartz boats, in a 6 inch quartz tube, in a 5 feet long tube furnace. Each boat held approximately 1 kilogram of spray dried powder. Twenty standard cubic feet per hour of nitrogen (N$_2$) was fed to the tube. The furnace was then heated following the heating profile: heated to 100 degrees Centigrade at a rate of 5 degrees Centigrade per minute, maintained for 3 hours, heated to 550 degrees Centigrade at 2 degrees Centigrade per minute, maintained for 6 hours, and then the furnace was cooled to 28 degrees Centigrade at the natural cooling rate of the furnace using convection cooling. The heating resulted in either the evaporation of the organics, or their decomposition into lighter components or carbonaceous material. During the pyrolysis process, the powder lost about 50-55 percent of its mass and roughly 50 percent of its volume. This process was repeated in several batches to pyrolyze all of the spray dried pyrolyzed powder.

The (i) pyrolysis step was followed by a (ii) calcination step in order to remove any residual carbonaceous material and fully oxidize any remaining hydroxyls. The pyrolyzed powder was loaded into multiple alumina boats that were stacked in a muffle furnace in air (CM Furnace having a capacity around 216 cubic inches). The furnace was heated to 600 degrees Centigrade at a rate of 1 degree Centigrade per minute, and maintained at this temperature for about 3 hours, followed by cooling the furnace to 28 degrees Centigrade at the natural cooling rate of the furnace using convection cooling. During the calcination process, the powder lost approximately about 10 percent of its mass based on the pyrolized powder, resulting in an approximate 60 percent mass loss based on the original spray dried powder. This process was repeated in several batches to calcine the spray dried pyrolyzed powder. The resultant powder had a surface area of about 336 square meters per gram, a pore diameter of about 39.6 Angstroms and a pore volume of about 0.42 cubic centimeter per gram.

Preparation of Monotlith Coated with Porous Alumina with Silver.

A slurry was prepared in isopropyl alcohol using the porous alumina with silver prepared in Example 1. The slurry comprised 25 weight percent porous alumina with silver in isopropyl alcohol. The resultant slurry was mixed in a Planetary Centrifugal Mixer (Thinky, capacity 310 cubic centimeters) for about 30 seconds and then ultrasonically milled for about 5 minutes. The slurry turned chocolate milk brown. The slurry was wash coated onto a cordierite monolith having a dimension of 6.23 milliliters bulk volume by dipcoating. The coated cordierite monolith was then calcined at 550 degrees Centigrade for about 4 hours to obtain a white colored catalyst comprising silver and alumina washcoated on the cordierite monolith. Weight of porous alumina with silver was 0.81 grams on cordierite monolith initially weighing 3.18 grams.

Examples 3-10 and Comparative Example 1-2

Test Conditions

The test conditions for the aforementioned catalyst compositions were as follows. The catalysts were pretreated with 7 percent H$_2$O and 50 parts per million SO$_2$, and 12 percent O$_2$ for 7 hours at 450 degrees Centigrade to "age" or "sulfur soak" the catalysts. The samples from the Examples listed above were disposed in a high throughput screen (HTS) reactor to determine their nitrogen oxide conversion capabilities in a simulated exhaust gas stream. The reactor had 32 tubes. A catalyst composition was placed in each tube except in tube #1. Tube #1 was used to measure the nitrogen oxide ($NO_x$) concentration in the exhaust gas stream. The catalyst composition Samples were placed in the other tubes and the reduction in $NO_x$ concentration is measured. Distillation cut of the ultra low sulfur diesel (ULSD) fuel having a boiling point of less than 210 degrees Centigrade was used as a reductant. The reduction in $NO_x$ concentration relates to catalytic activity of the catalyst compositions.

The simulated exhaust gas stream contained an exhaust gas composition. The exhaust gas composition was 12 percent $O_2$, 600 parts per million NO, 7 percent $H_2O$, 1 parts per million $SO_2$ and the balance $N_2$. Three samples of each catalyst were tested in each run and each catalyst was tested at four temperatures. The temperatures were 275 degrees Centigrade, 325 degrees Centigrade, 375 degrees Centigrade and 425 degrees Centigrade. For all the samples, using the HTS reactor, the $C_1$:NO ratio used in the exhaust gas composition was 8 ($C_1$:NO is defined as the number of carbon atoms in the reductant stream per number of nitrogen oxide (NO) molecules). The test results are included in Table 3 below.

Data is presented as percent $NO_x$ conversion by measuring the $NO_x$ concentration through tube #1 with no catalyst present and measuring the $NO_x$ concentration over the other tubes with catalysts and determining the percent change. The bar graph shown in FIG. 1 shows average $NO_x$ conversion of 3 samples (lower portion of each bar) and the standard deviation (the upper portion of each bar) obtained by testing the catalysts prepared in Example 1 and 2 and CE-1 at 375 and 425 degrees Centigrade.

Small angle X-ray scattering was used to characterize the catalyst composition manufactured in a manner similar to that described above. The resultant data indicates that the porous metal inorganic supports have average interdomain (interpore) spacings of 75 Angstroms and 95 Angstroms respectively.

Performance of Catalyst Compositions

This example compares conversion performance of $NO_x$ contained in an exhaust gas streams for samples that include embodiments of the invention relative to comparative catalyst compositions. The comparative catalyst compositions contain metal inorganic supports manufactured using TRITON™ X-114 as templating agent. The example catalyst compositions contain metal inorganic supports manufactured using TRITON™ X-102, and TRITON™ X-165 as templating agents.

TABLE 3

| Example | Temp. in Degrees Centigrade | $NO_x$ Conversion in percentage | $CO_2$ Conversion in percentage | Average Catalyst Activity × $10^{-6}$ |
|---|---|---|---|---|
| E-3 | 425 | 61.24 | 74.6 | 1.72 |
| E-4 | 375 | 82.2 | 61.1 | 2.3 |
| E-5 | 325 | 62.5 | 37.7 | 1.77 |
| E-6 | 275 | 23.9 | 13.2 | 6.73 |
| E-7 | 425 | 58.3 | 69.3 | 1.56 |
| E-8 | 375 | 70.7 | 52.5 | 1.87 |
| E-9 | 325 | 55.6 | 33.9 | 1.46 |
| E-10 | 275 | 24.0 | 12.9 | 6.29 |
| CE-2 | 425 | 55.0 | — | — |
| CE-3 | 375 | 35.0 | — | — |

The data provided in Table 3 indicates that a higher $NO_x$ conversion is obtained at temperatures of 375 degrees Centigrade and at 425 degrees Centigrade for Examples 3, 4 where TRITON™ X-102 was used as the templating agent and for Examples 7, 8 where TRITON™ X-165 was used as the templating agent. At the same temperatures in examples CE-2 and CE-3 where TRITON™ X-114 was used as the templating agent relatively lower $NO_x$ conversions were observed.

The catalyst composition may reduce $NO_x$ while using reductants that contain aromatic species or hydrocarbon species that on the average have less than four carbon atoms per molecule such as diesel.

With regard to the term reaction product, reference is made to substances, components, or ingredients in existence at the time just before first contacted, formed in situ, blended, or mixed with one or more other substances, components, or ingredients in accordance with the present disclosure. A substance, component or ingredient identified as a reaction product may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product.

All ranges disclosed herein are inclusive of the endpoints, and the endpoints are combinable with each other. The terms "first," "second," and the like as used herein do not denote any order, quantity, or importance, but rather are used to distinguish one element from another. The use of the terms "a" and "an" and "the" and similar referents in the context of describing the invention (especially in the context of the following claims) are to be construed to cover both the singular and the plural, unless otherwise indicated herein or contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A catalyst composition that converts nitrogen oxides in exhaust streams generated by combustion of fossil fuels, comprising:
a homogeneous solid mixture having ordered directionally aligned tubular meso-channel pores having an average diameter in a range of about 1 nanometer to about 15 nanometers, wherein the homogeneous solid mixture is comprised of
(i) at least one catalytic metal and
(ii) at least one metal inorganic network;
wherein the metal inorganic network is a metal carbide, nitride, hydroxide, carbonitride, oxynitride, boride, and/or borocarbide, or a metal oxide, wherein the metal in the metal inorganic network is one or more of aluminum, titanium, zirconium, manganese, zinc, iron, calcium, and/or manganese and excluding silicon and cerium; and
wherein the directionally aligned tubular meso-channel pores are formed by preparing the homogeneous solid mixture from a gel formed in the presence of a solvent, modifier, an inorganic halide, sulfate, nitrate, and/or sulfide salt precursor of the catalytic metal, an inorganic precursor of the metal inorganic network, and a templating agent,
wherein the templating agent comprises an octylphenol ethoxylate having a structure [I]

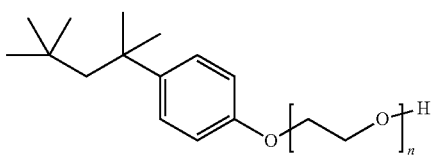

wherein "n" is an integer having a value of about 8 to 20.

2. The catalyst composition of claim 1, wherein "n" is an integer having a value of 12.

3. The catalyst composition of claim 1, wherein "n" is an integer having a value of 16.

4. The catalyst composition of claim 1, wherein the catalytic metal is a transition metal.

5. The catalyst composition of claim 1, wherein the catalytic metal comprises silver, gold, palladium, or platinum.

6. The catalyst composition of claim 1, wherein the catalytic metal comprises cobalt, nickel, or iron.

7. The catalyst composition of claim 1, wherein the metal inorganic network comprises alumina.

8. The catalyst composition of claim 1, wherein the pores are periodically spaced.

9. The catalyst composition of claim 1, wherein the pores have a periodicity in a range from about 5 nanometers to about 15 nanometers.

10. A catalyst composition according to claim 1 wherein n is an integer having a value of about 12 to 20.

11. A catalyst composition according to claim 1 wherein the precursor of the metal inorganic network is an inorganic alkoxide.

12. A catalyst composition according to claim 1 wherein the precursor of the metal inorganic network is aluminum alkoxide and the catalytic metal salt is silver nitrate.

13. A catalyst composition according to claim 1 wherein the catalytic metal is dispersed throughout the homogeneous solid mixture and throughout the pores of the solid mixture by preparing the homogeneous solid mixture from a gel formed in the presence of a solvent, modifier, an inorganic halide, sulfate, nitrate, and/or sulfide salt precursor of the catalytic metal, an inorganic precursor of the metal inorganic network, and a templating agent.

14. A catalyst composition that converts nitrogen oxides and carbon dioxide in exhaust streams generated by combustion of fossil fuels, comprising:
a homogeneous solid mixture having ordered directionally aligned tubular meso-channel pores having an average diameter in a range of about 1 nanometer to about 15 nanometers, wherein the homogeneous solid mixture is comprised of
(i) at least one catalytic metal intermixed with
(ii) at least one metal inorganic network;
wherein the metal inorganic network is a metal carbide, nitride, hydroxide, carbonitride, oxynitride, boride, and/or borocarbide, or a metal oxide, wherein the metal in the metal inorganic network is one or more of aluminum, titanium, zirconium, manganese, zinc, iron, calcium, and/or manganese and excluding silicon and cerium; and
wherein the directionally aligned tubular meso-channel pores are formed by preparing the homogeneous solid mixture by calcination of a gel formed in the presence of a solvent, modifier, an inorganic silver salt, an aluminum alkoxide precursor of the metal inorganic network, and a templating agent, and
wherein the templating agent comprises an octylphenol ethoxylate having a structure [I]

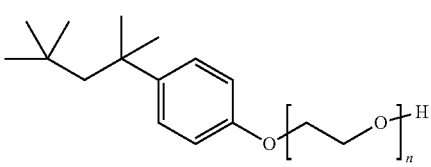

wherein "n" is an integer having a value of about 12 to 20.

* * * * *